US000002000B1

(19) United States

(12) Statutory Invention Registration (10) Reg. No.: US H2000 H

Middlesworth et al. (43) Published: *Nov. 6, 2001

(54) METHOD FOR MAKING POLYOLEFIN/FILLER FILMS HAVING INCREASED WVTR

(75) Inventors: Jeffrey Alan Middlesworth, Wauconda; Kevin Arthur Brady, Cary, both of IL (US)

(73) Assignee: Exxon Chemical Patents, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/691,106

(22) Filed: Aug. 1, 1996

(51) Int. Cl.[7] ..... B29C 47/00; B29C 49/08; B31F 81/00; B28B 11/08

(52) U.S. Cl. ..... 156/244.11; 156/196; 156/244.23; 156/244.27; 264/288.4; 264/293; 428/304.4; 428/308.4

(58) Field of Search ..... 156/196, 201, 156/219, 229, 244.11, 244.23, 244.24, 244.27, 309.9, 322; 264/288.4, 288.8, 293, 299; 428/304.4, 308.4

(56) References Cited

U.S. PATENT DOCUMENTS

| | | | | |
|---|---|---|---|---|
| 4,350,655 | | 9/1982 | Hoge | 264/145 |
| 4,472,328 | | 9/1984 | Sugimoto et al. | 264/41 |
| 4,777,073 | | 10/1988 | Sheth | 428/155 |
| 4,929,303 | | 5/1990 | Sheth | 156/209 |
| 5,008,204 | * | 4/1991 | Stehling | 436/85 |
| 5,055,338 | | 10/1991 | Sheth et al. | 428/155 |
| 5,169,712 | | 12/1992 | Tapp | 428/315.5 |
| 5,206,075 | * | 4/1993 | Hodgson, Jr. | 428/216 |
| 5,382,630 | * | 1/1995 | Stehling et al. | 525/240 |
| 5,470,811 | * | 11/1995 | Jejelowo et al. | 502/117 |
| 5,955,187 | * | 9/1999 | McCormack et al. | 428/315.5 |

FOREIGN PATENT DOCUMENTS

| | | |
|---|---|---|
| 0691203 A1 | 1/1996 | (EP) . |
| 07118431 | 5/1995 | (JP) . |
| WO 95/02630 | 1/1995 | (WO) . |

OTHER PUBLICATIONS

Patent Abstracts of Japan: Abstract of JP 07118431.

* cited by examiner

*Primary Examiner*—Michael J. Carone
*Assistant Examiner*—Aileen J. Baker
(74) *Attorney, Agent, or Firm*—Thomason, Moser & Patterson, L.L.P.

(57) ABSTRACT

Films, made of polyethylenes and filers, and articles made therefrom greater WVTR than previously available films based on conventional Zeigler-Natta based polyethylenes. The polyethylenes are produced in a metallocene-catalyzed production process. The films may be made by a cast film process, and may be made in widely varying filler content, generally polyethylene to filler ratios of 30/70 to 70/30. The metallocene based polyethylenes when combined with filler also permit the extrusion of thinner films leading to lighter weight and softer films. The m-polyethylenes utilized for making such films typically have a Composition Distribution Breadth Index above 50%, a $M_w/M_n$ below 3, and a $M_z/M_w$ below 2. The films may be used advantageously in composite structures with fabrics (either woven or non-woven) to fabricate such articles as house-wrap

23 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR MAKING POLYOLEFIN/FILLER FILMS HAVING INCREASED WVTR

TECHNICAL FIELD

This invention relates generally to polyolefin films having greatly increased water vapor transmission rate, herein after denoted as WVTR and methods of making same. More specifically this invention is directed toward filled polyethylene films having increased WVTR at a given filler loading, and a given set of process conditions.

BACKGROUND

Preparation of films having good WVTR from highly filled polymers, usually polyolefins, are known. In the past a combination of a polyolefin, usually a polyethylene, with a filler, usually $CaCO_3$, while very useful and widely used as a film with good WVTR, usually in combination with non-woven polymers (for use in diapers, adult incontinence devices, feminine hygiene articles, housewrap composites, roofing materials and the like), have had some limitations that were well known in the industry.

Among these limitations are a practical limitation in thickness (also expressed as basis weight) in that conventional Ziegler-Natta catalyzed polymers, more specifically linear low density polyethylene (LLDPE) highly filled film formulations could not generally be drawn down below 3 mils. The most obvious problem with such a limitation is that the user of the film could not make a product utilizing a lower thickness film, meaning that the cost of the film (usually sold on a weight basis) might have been higher than the application necessitated. A less obvious issue is that at lower thicknesses, for the same density resin at the same filler loading, the product would be relatively softer than higher thicknesses, an attribute of importance in any article that comes in contact with humans, such as apparel.

Another limitation of previous polyethylene/filler films is that for a given filler loading, with conventional Z-N catalyzed polyethylene resins, is WVTR, limited (on the upper end) by the amount of post-extrusion orientation that could be practically achieved. Additionally, the imperfections often found in conventional Z-N resins and films, such as gels, made reaching and maintaining a high rate of production difficult, and a high level of orientation might often lead to breaks, holes, or tear offs in the film leading to lower prime production rates.

Yet another limitation of the conventional Z-N filled and oriented films is related to both WVTR and production rates. Specifically, with a given conventional filled polyethylene, to attain a certain WVTR, a certain filler loading had to be used. In general, within limits, the higher the filler loading, the more difficult to process ( the above referenced production problems such as large void creation and tear offs are exacerbated by a higher filler loading, as the film maker seeks to maximize production rates).

U.S. Pat. No. 4,777,073 suggests a permeability and strength of polyethylene/filler combinations may be attained by combining a LLDPE described as being made using a Zeigler-Natta or chromium catalysts, with fillers such as $CaCO_3$ present in the LLDPE from 15 to 35 percent by volume which is equivalent to 34–62% by weight.

There is a commercial need therefore for a polyethylene filler combination that will give a higher WVTR at a given filler loading, at an equivalent thickness. There is a similar need for a polyethylene filler combination that can deliver equivalent WVTR at lower filler loadings and can be made at a lower basis weight, than a conventional Z-N polyethylene/filler combination.

SUMMARY

We have discovered that making a film from a polyethylene/filler combination using a metallocene catalyzed polyethylene, surprisingly and unexpectedly provides the ability to achieve a substantially higher WVTR (at comparable filler loading and thickness), a lower thickness (or basis weight) (at comparable filler loading and orientation), and can achieve an equivalent WVTR at lower filler loadings (improving processability) when compared to conventional Z-N polyethylene/filler combination.

The metallocene catalyzed polyethylenes (m-polyethylene) will have a molecular weight distribution (defined as the ratio of weight average molecular weight to number average molecular weight $M_w/M_n$) generally less than 3, preferably less than 2.5.

The drawdown of a filled m-polyethylene will be more than 10, preferably more than 20, more preferably more than 30 percent less than the ultimate drawdown of a filled Z-N polyethylene, where the relationship in the filled Z-N polyethylene between the filler amount and basis weight (minimum) for films follow the general equation:

$$W=2.10+0.380\ (\text{weight \% } CaCO_3)$$

where W is the minimum basis weight in g/m2 in the film.

The relationship is at constant draw (orientation transverse direction or TD) of 2.7:1, line speed 340 feet per minute (fpm). For m-polyethylene filled formulations the following general equation applies:

$$W=3.07+0.207\ (\text{weight \% } CaCO_3)$$

Additionally the water vapor transmission rate (WVTR) of a filled m-polyethylene is at least 10 percent greater, preferably at least 20 percent, more preferably at least 30 percent greater than a filled Z-N polyethylene, at the same filler loading and thickness (basis weight), where the Z-N polyethylene/filler WVTR is described by the equation:

$$WVTR=-10{,}900+320\ (\text{weight \% } CaCO_3)$$

where the WVTR is in $g/m^2/124$ hours, measured at 37.8° C., 90% RH. While a film including a m-polyethylene and filler follows the general equation:

$$WVTR=-9967+358\ (\text{weight \% } CaCo_3)$$

The relationship is at constant draw (orientation TD) of 2.7:1, line speed 340 feet per minute (fpm).

BRIEF DESCRIPTION OF THE DRAWINGS

The foregoing aspects, features and advantages of the present invention will become clearer and more fully understood when the following detailed description, and appended claims are read in conjunction with the accompanying drawings, in which:

DETAILED DESCRIPTION

Introduction

Figure 1:
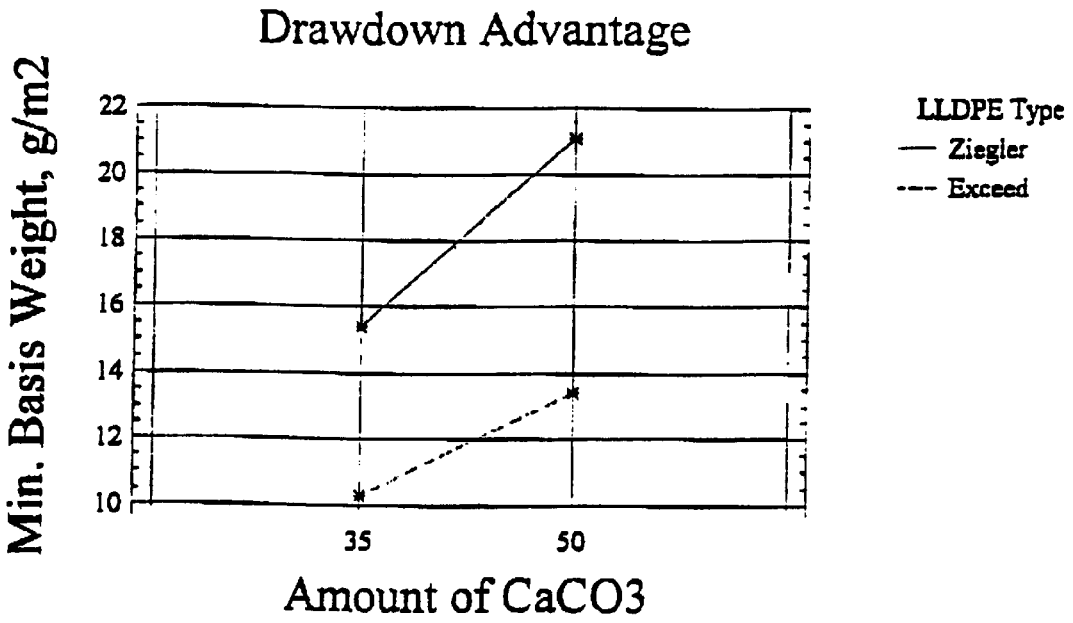
FIG. 1 illustrates the drawdown advantage of filled m-polyethylene over Z-N polyethylene with a plot of minimum basis weight in g/m2 versus filler loading.

This invention concerns certain polyethylene/filler films that will have high WVTR and the ability to be drawn down to low basis weights and methods for making same. Particularly useful in these films and methods will be m-polyethylenes.

In certain embodiments of the present invention films of m-polyethylene and filler can be made with lower amounts of filler and still attain substaintially the same WVTR as previously known and used Z-N polyethylene/filer combinations (at higher filler loadings) are also contemplated. This invention further includes certain m-polyethylenes, their conversion into fabricated articles such as films, articles made from such films, and applications in which such articles having high WVTR combined with good physical properties are desirable. The resulting films, and film composites, (including coextruded and laminated films) have combinations of properties rendering them superior and unique to films or film composites previously available. The filled m-polyethylene films disclosed herein are particularly well suited for use in producing certain classes of high WVTR films, consumer and industrial articles using the films in combination with for instance, polymeric woven or non-woven materials. Such consumer articles include, but are not limited to diapers, adult incontinence devices, feminine hygiene articles, medical and surgical gowns, medical drapes, industrial apparel, building products such as "housewrap", roofing components, and the like made using one or more of the films disclosed herein.

Additionally the films having increased WVTR of the present invention may also be used in metallized films with a high WVTR, according to the disclosure of U.S. Pat. No. 5,055,338, fully incorporated herein for purposes of U.S. Patent practice.

Housewrap

Fabrics suitably laminated to the breathable film in the housewrap of the present invention include any high strength fabric which can be bonded to the breathable film without adversely affecting the water vapor permeability or the resistance to air permeability of the breathable film, i.e. the fabric must generally have a suitably open mesh to avoid substantialy blocking the micropores of the breathable film. The fabric may be woven of any suitable material, but is preferably non woven polyolefin such as, for example, low density polyethylene, polypropylene, and preferably linear, low density polyethylene or high density polyethylene. The fabric should have an elongation (ASTM D1682) less than about 30%: an Emendorf tear strength (ASTM D689) of at least about 300 g, preferably at least about 600 g and especially at least about 900 g: and a break load (ASTM D1682) of at least about 15 lb/in., preferably at least about 25 lb/in., and especially at least about 30 lb/in/ These fabrics are believed to be prepared from HDPE films having outer layers of ethylene vinyl acetate coextruded on either side of the HDPE or heat seal layers. The films are fibrillated, and the resulting fibers are spred in at least two transverse directions at a strand count of about 6010 per inch. The spread fibers are then cross laminated by heat to produce a nonwoven fabric of 3–5 mils with about equal MD and TD strength. These fabrics have excellent strength properties in both MD and TD for reinforcing the breathable film, an open structure to avoid substantially blocking the micopores of the breathable film when laminated thereto, and an outer layer of ethylene vinyl acetate copolymer for heat sealability.

The fabric and the breathable film are laminated together to form the breathable composite of the invention. The lamination may be effected by facing the film and the fabric together and applying heat and pressure. The laminating temperatures to which the film and fabric are exposed should be sufficient to achieve lamination, but should not be too high in order to avoid the flow of the film polymer into the microporous spaces and consequent reduction in water vapor transmissibility. In a preferred embodiment, the fabric is heated on a hot roller, preferably at 200°–240° F., and then pressed, prefeably at a pressure of about 50–100 psi, into contact with the unheated film to bond the fabric and film into laminate.

Preferred fabrics are commercially available under the trade designation DD1001, CC-2001 and CC-3001 CLAF nonwoven HDPE Fabrics.

In an embodiment of our invention, the filled m-polyethylene films, when oriented after film formation, would surprisingly and unexpectedly have high WVTR when compared to a filled polyethylene film made using previously available Z-N catalyzed polyethylenes. Following is a detailed description of certain preferred m-polyethylenes, films, or film composites made using these m- polyethylenes and articles made from the films or film composites, that are within the scope of the present invention. Those skilled in the art will appreciate that numerous modifications to these preferred embodiments can be made without departing from the scope of the invention. For example, although films based on low density m-polyethylenes filled with CaCO3 are exemplified herein, the films may be made using combinations of m-polyethylenes with other polyolefins and with other fillers or filler combinations. To the extent my description is specific, it is solely for the purpose of illustrating preferred embodiments of my invention and should not be taken as limiting the present invention to these specific embodiments.

Production of the Films

Films contemplated by certain embodiments of the present invention may be made utilizing m-polyethylenes, by processes including, blown and cast, prefered is a cast film process. In such extrusion processes, the films of the present invention can be formed into a single layer film, or may be one layer or more of a multi-layer film or film composite. Alternatively, the m-polyethylene films described in this disclosure can be formed or utilized in the from a resin blend where the blend components can function to modify WVTR, physical properties, draw-down sealing, cost, or other functions. Both blend components and functions provided thereby will be known to those of ordinary skill in the art. Films of the present invention may also be included in laminated structures. As long as a film, multi layer film, or laminated structure includes one or more m-polyethylene/filler film layers having the WVTR, or draw-down, and the like of the film, and the $M_w/M_n$, CDBI and the like of the m- polyethylene , in the ranges described herein, it will be understood to be contemplated as an embodiment of the present invention.

Polyolefin Component

The polyolefin component can be any film forming polyloefin or polyolefin blend, as long as the majority of the polyolefin component is a polyolefin with the following features:

| | preferred | more preferred | most preferred |
|---|---|---|---|
| Mw/Mn | <3 | <2.5 | |
| CDBI | >50% | >60% | >65% |
| Mz/Mn | <2 | | |

Generally these ranges dictate the use of a metallocene catalyzed polyolefin, preferred is a m-polyethylene, preferably a linear low density m-polyethylene with a density in the range of from about 0.90–0.940, preferred 0.910–0.935, more preferred 0.912–0.925 g/cc. Densities referred to herein will generally be polymer or resin densities, unless otherwise specified.

There is a wide variety of commercial and experimental m-polyethylene resins useful in the manufacture of films included in certain embodiments of the present invention. A non-inclusive list is found below along with the general bulk resin properties as published:

TABLE A

| Commercial Designation | Density ($g/cm^3$) | Melt Index/ Melt Flow (g/10 min.) | Type |
|---|---|---|---|
| Exceed ® 103 (now 350L65 or 350D60)* | 0.917 | 1.0 | eth/hexene |
| Exceed ® 301 now 357C80* | 0.918 | 3.4 | eth/hexene |
| Exceed ® 377D60* | 0.922 | 1.0 | eth/hexene |
| Exceed ® 109* | 0.925 | 0.75 | eth/hexene |
| Exact ® 3028* | 0.900 | 1.2 | eth/butene |
| Exceed ® 357C32+ | 0.917 g/cc | 3.4 | |
| Exceed ® 363C32 | 0.917 g/cc | 2.5 | |
| ECD-401 | 0.917 g/cc | 4.5 | |
| Exceed ® 377D60 | 0.922 g/cc | 1.0 | |
| Exceed ® 399L60 | 0.925 g/cc | .75 | |

*available from Exxon Chemical Co. Houston, TX, USA
+The Exceed ® 357C32 is the same resin grade as the ECD-112 and ECD-115 used in the experiments.

It will be understood that in general we contemplate that a large number of m-polyethylenes will be useful in the techniques and applications described herein. Included components: ethylene-1-butene copolymers, ethylene-1-hexene copolymers, ethylene-1-octene copolymers, ethylene-4-methyl-1-pentene copolymers, ethylene dodecene copolymers, ethylene-1-pentene copolymers, as well as ethylene copolymers of one or more C4 to C20 containing alpha-olefins, diolefins, and combinations thereof. A nonexclusive list of such polymers; ethylene, 1-butene, 1-pentene; ethylene, 1-butene, 1-hexene; ethylene, 1-butene, 1-octene; ethylene, 1-butene, decene; ethylene, 1-pentene, 1-hexene; ethylene, 1-pentene, 1-octene; ethylene, 1-pentene, decene; ethylene, 1-octene; 1-pentene; ethylene 1-octene, decene; ethylene, 4-methyl-1-pentene, 1-butene; ethylene 4-methyl-1-pentene, 1-pentene; ethylene, 4methyl-1-pentene, 1-hexene; ethylene 4-methyl-1-pentene, 1-octene; ethylene, 4-methyl-1-pentene, decene. Included in the ethylene copolymers will be one or more of the above monomers included at a total level of 0.2 to 6 mole percent, preferably 0.5 to 4 mole percent, or such mole percents consistent with the resin densities contemplated.

The resin and product properties recited in this specification were determined in accordance with the following test procedures. Where any of these properties is referenced in the appended claims, it is to be measured in accordance with the specified test procedure.

TABLE B

| Property | Units | Procedure |
|---|---|---|
| Melt Index | dg/min | ASTM D-1238(E) |
| Density | g/cc | ASTM D-1505 |
| WVTR | $g/m^2/day$ | described herein |
| Gurley | seconds | described herein |

FILLER

Fillers useful in this invention may be any inorganic or organic material having a low affinity for and a significantly lower elasticity than the polyolefin component. Preferably the filler should be a rigid material having a non-smooth hydrophobic surface, or a material which is treated to render its surface hydrophobic. The preferred mean average particle size of the filler is between about 0.5–5 microns for films generally having a thickness of between 1–6 mils prior to stretching. Examples of the inorganic fillers include calcium carbonate, talc, clay, kaolin, silica, diatomaceous earth, magnesium carbonate, barium carbonate, magnesium sulfate, barium sulfate, calcium sulfate, aluminum hydroxide, zinc oxide, magnesium hydroxide, calcium oxide, magnesium oxide, titanium oxide, alumina, mica, glass powder, zeolite, silica clay, etc. Calcium carbonate is particularly preferred for low cost, whiteness, inertness, and availability. The inorganic filler such as calcium carbonate are preferably surface treated to be hydrophobic so that the filler can repel water to reduce agglomeration of the filler. Also, the surface coating should improve binding of the filler to the polymer while allowing the fuller to be pulled away from the polyolefin under stress. A preferred coating is calcium stearate which is FDA compliant and readily available. Organic fillers such as wood powder, and other cellulose type powders may be used. Polymer powders such as Teflon® powder and Kevlar® powder can also be used.

The amount of filler added to the polyethylene depends on the desired properties of the film including tear strength, water vapor transmission rate, and stretchability. However, it is believed that a film with good WVTR generally cannot be produced as is taught herein with an amount of filler less than about 20 percent by weight of the polyolefin/filler composition.

The minimum amount of filler is needed to insure the interconnection within the film of voids created at the situs of the filler particularly by the stretching operation to be subsequently performed on the precursor film. Further, it is believed that useful films could not be made with an amount of the filler excess of about 70 percent by weight of the polyolefin/filler composition. Higher amounts of filler may cause difficulty in compounding and significant losses in strength of the final breathable film.

While a broad range of fillers has been described at a broad range of inclusion parameters based on weight percentages, other embodiments are contemplated. For instance, fillers with much higher or much lower specific gravities may be included in the polyolefin at amounts outside the weight ranges disclosed, they will be understood to be contemplated as embodiments of our invention as long as the final film, after orientation has WVTR or drawn down similar to that described herein.

STRETCHING OR ORIENTING AND HEAT SETTING

Final preparation of a breathable film is achieved by stretching the filled m-polyethylene precursor film to form interconnected voids. Stretching or "Orientation" of the film may be carried out monoaxially in the machine direction (MD) or the transverse direction(TD) or in both directions (biaxially) either simultaneously or sequentially using conventional equipment and processes following cooling of the precursor film.

Film orientation may also be carried out in a tentering device with or without MD orientation to impart TD orientation to the film. The film is gripped by the edges for processing through the tentering device.

Stretching of melt embossed precursor films with a tentering device at a film speed of about 200–500 per minute produces breathable films having the desired water vapor permeability. The resulting films had a greater permeability in the areas of reduced thickness in comparison to the areas of greater thickness.

A range of stretching ratios from 2:1 to 5:1 prove satisfactory for MD stretching with a ratio of 4:1 being preferred.

A range of stretching ratios of 2:1 to 5:1 prove satisfactory for TD stretching with a ratio of 3:1 being preferred.

It is preferred that tension be maintained on the film during the heat setting and cooling to minimize shrinkback. Upon cooling to ambient temperature (i.e., room temperature) or near ambient, the holding force may be released. The film may contract somewhat (snapback) in the TD but will retain a substantial portion of its stretched dimension.

Heat setting can be accomplished by maintaining the film under tension in the stretched condition at the heat setting temperature for about 1–2 minutes. Preferably, however, the heat setting and cooling is carried out while permitting the film to contract slightly, but still under stress. The controlled shrinkback of from 5 to 30%, preferably between 15 and 25%, of the maximum stretched width has given particularly good results in eliminating storage shrinkage.

Properties of films produced from the resins

WVTR

In an embodiment of the present invention, certain films and articles made therefrom have higher WVTR than previously thought possible. The WVTR of such films should be above 100 g/m$^2$/day @ 37.8° C., 90% RH, preferably above 1000, more preferably above 3000 g/m$^2$/day @ 25° C. This can be seen in FIG. 2 which illustrates the WVTR advantage of m-polyethylene versus Z-N polyethylene in a plot of WVTR versus percentage percentage of filler $CaCO_3$.

In general the films of embodiments of the present invention will have a much higher WVTR at the same filler loading than previously known Z-N polyethylene based filled films. Specifically, the inventive films will have a WVTR at least 10% higher than the WVTR of the comparative films described by the equation:

$$WVTR = -10{,}900 + 320\ (\text{weight \% } CaCO_3)$$

In another embodiment of our invention a m-polyethylene/filler combination film can be stretched (oriented or tentered in the TD) less than a Z-N polyethylene combination film, and still achieve substantially the same WVTR (at generally the same filler loadings). This is a significant advantage to a film maker because the greater the orientation, the greater the chance for a film imperfection to be magnified, potentially causing a catastrophic failure (break).

It is not beyond the scope of embodiments of my invention to blend the m-polyolefins to form the films of the invention with other materials such as other linear polyethylenes (HDPE, MDPE, LLDPE), low density polyethylene (LDPE), polypropylene (PP) (homopolymers and copolymers), polybutene-1 (PB), ethylene vinyl acetate (EVA), or other ethylene polar comonomer copolymers and the like to fabricate useful articles. Such potential blend polyolefins may be conventional Zeigler-Natta catalyzed, chromium catalyzed, free radical initiated, and the like. However, the WVTR of the layer or layers intended to impart WVTR should generally be within limits disclosed above. Additionally, any blend component or components additive or additives should be chosen such that the desired WVTR of the film remains at or above the targeted or desired value. Any blend should preferably contain a majority of m-polyethylene as the polyolefin component, specifically greater than 50 weight percent, preferably greater than 60 weight percent, more preferably greater than 70 (75?) percent, based on the total weight of the polyolefin Definitions and Test Protocols

| Value | Units | Definition or Test |
|---|---|---|
| Density | g/cm$^3$ | ASTM D-792 |
| CDBI | % | *Definitions test determination contained in this application |
| Molecular weight distribution | none | |

TEST METHODS

Water Vapor Transmission Rate

The WVTR test measures the quantity of water vapor that is able to pass through a film. A Mocon Permatran W-1 unit is used to measure WVTR by passing a stream of dry air across the surfaces of the film. The dry air picks up moisture that has passed, from wet pads underneath the film, through to the top surface.

The moisture level is measured by an infrared (IR) detector and converted to a voltage which can be measured on a chart recorder. The procedure also includes:

a) Punching out a die cut hole in an aluminum foil mask, b) Cutting off two opposing corners of the mask, c) Peeling paper backing off of mask, d) Cutting 2"×2" squares of film and place them over the hole in the mask, e) Putting the paper backing back on the foil mask, then f) Placing the masked sample in the test cell with the aluminum side up. The chart recorder reading is multiplied by 100 to give the WVTR value.

Gurley Porosity

Teleyn Gurley Model 4190 Porosity Tester with sensitivity attachment is used. With the procedure as follows:

a) Cutting a strip of film (~2" wide) across the entire web width, b) Inserting a film sample to be tested between orifice plates, c) Setting the sensitivity adjustment on "5", d) Turning the inner cylinder so that the timer eye is vertically centered below the 10 cc silver step on the cylinder, e) Resetting the timer to zero, f) Pulling the spring clear of the top flange and releasing the cylinder, When the timer stops counting, the test is completed. The number of counts is multiplied by 10 and the resulting number is "Gurley seconds per 100 cc".

It will be appreciated by those of ordinary skill in the art that the films of m-polyethylene resins of certain embodiments of the present invention, can be combined with other materials, depending on the intended function of the resulting film.

Other methods of improving and/or controlling WVTR properties of the film or container may be used in addition to the methods described herein without departing from the intended scope of my invention. For example, mechanical treatment such as micro pores.

DRAWDOWN

Embodiments of the present invention offer a significant and unexpected improvement in the ability for the formulations to be drawn down. Specifically, using conventional Z-N polyethylenes, a lower limit of 2.5, more practically 3.5 mils has routinely been observed (as extruded) upstream, i.e. before orientation. By contrast, films of embodiments of the present invention, may be drawn down to a practical limit of 2 mils, providing a significant advantage in terms of either economics or a combination of economics and softness. The softness comes abvout due to the decreased modulus of the lower thickness. Ultimate drawdown is defined as minimum gage (or basis weight) before the onset of draw resonance at a given extruder rate (e.g., lb/hr).

Figure 2:
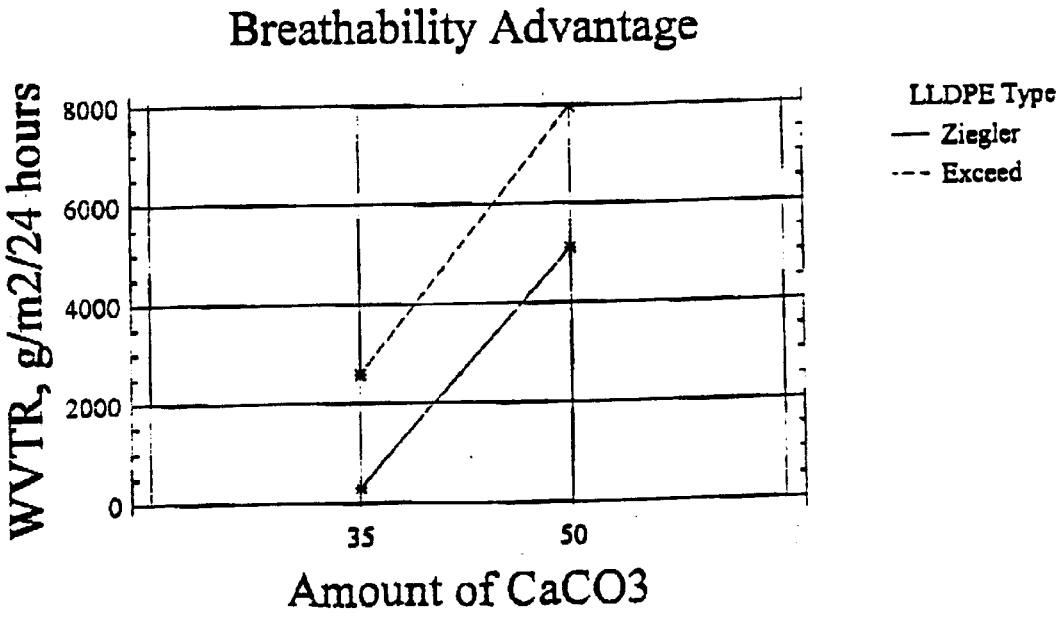
FIG. 2 illustrates the WVTR advantage of m-polyethylene versus Z-N polyethylene in a plot of WVTR versus percentage of filler $CaCO_3$ both at 2.7:1 draw ratio and 22 $g/m^2$ basis weight

The films of embodiments of the present invention will have ultimate drawdown more than 20%, preferably 25%, more preferably 30% less than that of filled Z-N polyethylene which, from FIG. 2 has an ultimate drawdown described by the general formula:

$$W=2.1+0.380\ (\text{weight \% } CaCO_3)$$

EXAMPLES

All polyethylene/filler materials were stabilized to diminish the effects of extrusion.

Orientation of all the following examples was performed at a 2.7:1 draw ratio, at 35° fpm, 150–220 °F. tenter temperature, 180–230° F. annealing temperature.

Example 1–3

Examples 1–3 were fabricated from Escorene™ LL 3003.09 on a 6 inch Marshall & Williams cast extrusion line at normal processing conditions processing conditions listed in Table 1a. Example 1 used a 50/50 weight ratio of the polyethylene to $CaCO_3$, while examples 2–3 used a 65/35 ratio of polyethylene to filler all films were subsequently oriented (TD) to three different basis weights as seen in Table 1.

Examples 4–9

Examples 4–9 were fabricated from Exceed™ ECD-112, under the same processing conditions as examples 1–3. Examples 4–6 used a 50/50 weight ratio of the polyethylene to $CaCO_3$, while examples 7–9 used a 65/35 ratio of polyethylene to filler. All films were subsequently oriented (TD) to three different basis weights as seen in Table 2.

From the data in Table 1 for each of these examples run, it can be seen that in Example 1 and 2; as filler level goes down, WVTR goes down dramatically, and as seen from example 3 a lower basis weight only marginally increases the WVTR of the film with a higher percentage of polyethylene. By contrast, from table 2 for examples 4–9, a much higher WVTR is achieved by the same filler loading and basis weight, than for the films of examples 1–3, moreover, while a higher percentage of polyethylene in the formulation (examples 4–6 vs. 7–9) generates a diminution of WVTR, the percentage is far lower than that experienced for the Z-N polyethylene of examles 1–3 (95% reduction vs. 68% reduction)

Examples 10–15

Examples 10–15 are run as in Example 4–9, but the polyolefin component was a blend of LD-202 (12-MI, 0.917 g/cc low density polyethylene available from Exxon Chemical Co.) and ECD112. As can be seen from the data in Table 3, at the same basis weight Examples 4–6, and 7–9, the corresponding films of Examples 10–15 had somewhat lower, but still acceptable WVTR. Also of note is Example 15 which was the lowest basis weight attainable in this series (1–15) of examples (again orientation was TD).

Examples 16–23

Examples 16–23 were extruded similar conditions to the previous examples, into two (2) thickness of precursor (before orientation) film (4.5 and 6 mils) and oriented in the MD at 175° F. While WVTR results for this set of examples appear to be substantially the same for both metallocene and Z-N polyethylenes, it is anticipated that when the orientation speed is increased, the m-LLDPE will show improved WVTR, over the Z-N-LLDPE, just as found in the TD orientation in examples 1–15. The results are shown in Tables 4 and 5.

Examples 24–25

Examples 24 and 25 were extruded under substantially the same conditions as the previous examples. Examples 24 is substantially the same in polyethylene/filler content as example 4 and example 25 is substantially the same make-up as example 1.

Example 24 was drawn (oriented) at a 2.7:1 draw ratio, while example 25 was drawn at a 3.8:1 ratio. These examples show that the m-LLDPE at a lower (28%) draw ratio than the Z-N LLDPE, example 24 has generally the same WVTR. The results are shown in Table 6.

While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or to blend resins to form the claimed films with other polymers or laminate the claimed films to other materials such as polymer non-wovens and the like. For this reason, then, reference should be made solely to the appended claims for purposes of determining the true scope of the present invention.

TABLE 1

ORIENTED FILM PROPERTIES
LL 3003.09 Based Samples

| PROPERTIES | Example 1 | Example 2 | Example 3 |
|---|---|---|---|
| Basis Wt., g/m$^2$ | 22.1 | 22.5 | 18.7 |
| Yield, yd$^2$/lb. | 24.6 | 24.1 | 29.0 |
| Emb. Cal., mils | 1.17 | 1.13 | .98 |
| Gurley, seconds | 1137 | Off-Scale | Off-Scale |
| WVTR, g/m$^2$/24 | 5100 | 300 | 500 |
| MD Tear, g | 473 | 486 | 386 |
| TD 170° F. | 9 | 8.5 | 7.8 |
| Opacity, % | 59.5 | 39.1 | 38.1 |
| MD 10%, g/in | 319.8 | 417.9 | 392.0 |
| MD 25%, g/in | 352.1 | 429.6 | 414.1 |
| MD Ult., g/in | 456.2 | 494.4 | 492.3 |
| MD Elg., % | 343.8 | 340.8 | 358.6 |
| TD 10%, g/in | 688.0 | 900.4 | 728.0 |
| TD 25%, g/in | 1092 | 1391 | 1134 |
| TD Ult., g/in | 1725 | 2025 | 1842 |
| TD Elg., % | 127.1 | 131.6 | 136.5 |
| DR Limit g/m$^2$ | 21.1 | 15.4 | — |

The "DR Limit" also know as "Ultimate Drawdown" is the basis weight at which we first observed draw resonance. The DR probe was conducted with the fpm fixed at 340 and the extruder RPM reduced gradually until the onset of draw resonance.

TABLE 1a

Extrusion Conditions
(for 22 g/m$^2$ samples)

| CONDITION | Example 1 | Example 2 | Example 4 | Example 7 | Example 10 | Example 14 |
|---|---|---|---|---|---|---|
| Ext. RPM | 23.0 | 26.4 | 19.1 | 21.6 | 29.5 | 31 |
| Upstream, psi | 3480 | — | 3740 | 3730 | 4630 | 4430 |
| Down, psi | 1310 | — | 1270 | 1160 | 1630 | 1490 |
| Melt Temp., F. | 427 | 436 | 430 | 431 | 458 | 451 |
| Up Width, " | 23.4 | 23.3 | 21.8 | 21.8 | 31.1 | 30.4 |
| Down Width, " | — | 60.9 | 62.6 | 62.1 | 86.4 | — |
| Cast Roll, fpm | 318 | 341 | 340 | 340 | 339 | 340 |

draw ratio for all examples targeted at 2.7–1, (ratio of outlet divided by inlet width)

TABLE 2

ORIENTED FILM PROPERTIES
For Exceed ™ ECD-112 Based Samples

| PROPERTIES<br>Basis wt g/m$^2$<br>(Target) | Example 4<br>22 g/m$^2$ | Example 5<br>18.5 g/m$^2$ | Example 6<br>15 g/m$^2$ | Example 7<br>22 g/m$^2$ | Example 8<br>18.5 g/m$^2$ | Example 9<br>15 g/m$^2$ |
|---|---|---|---|---|---|---|
| Basis Wt., g/m$^2$ | 22.7 | 18.6 | 15.2 | 22.8 | 19.2 | 14.8 |
| Yield, yd$^2$/lb. | 23.9 | 29.2 | 35.7 | 23.8 | 28.3 | 36.7 |
| Emb. Cal., mils | 1.23 | .96 | .81 | 1.24 | 1.03 | .77 |
| Gurley, seconds | 216 | 159 | 127 | 3608 | 2140 | 1095 |
| WVTR, g/m$^2$/24 | 7950 | 8350 | 8450 | 2575 | 3675 | 4010 |
| MD Tear, g | 400 | 360 | 330 | 418 | 405 | 292 |
| TD 170° F. | 8.0 | 7.2 | 7.2 | 7.2 | 7.0 | 6.5 |
| Opacity, % | 66.2 | 62.3 | 59.1 | 51.6 | 48.3 | 44.9 |
| MD 10%, g/in | 299.6 | 221.6 | 191.9 | 434.4 | 369.6 | 288.1 |
| MD 25%, g/in | 383.3 | 247.1 | 213.0 | 435.0 | 368.2 | 285.3 |
| MD Ult., g/in | 496.9 | 323.6 | 296.5 | 501.6 | 411.9 | 304.7 |
| MD Elg., % | 327.5 | 290.0 | 331.2 | 293.2 | 276.4 | 271.4 |
| TD 10%, g/in | 737.3 | 623.6 | 513.7 | 932.9 | 836.4 | 678.6 |
| TD 25%, g/in | 1182 | 1003 | 851.8 | 1503 | 1342 | 1111 |
| TD Ult., g/in | 2261 | 1863 | 1574 | 2942 | 2689 | 2197 |
| TD Elg., % | 110.2 | 100.7 | 95.5 | 103.5 | 103.3 | 97.1 |
| DR Limit g/m$^2$ | 13.4 | — | — | 10.3 | — | — |

The "DR Limit" is the basis weight at which we first observed draw resonance. The DR probe was conducted with the fpm fixed at 340 and the extruder RPM reduced gradually until the onset of draw resonance.

TABLE 3

ORIENTED FILM PROPERTIES
For samples based on Exceed ™ ECD-112 blended with LDPE (LD-202)

| PROPERTIES | Example 10<br>37.5% ECD<br>12.5% LD<br>50% Calc<br>22 g/m$^2$ | Example 11<br>37.5% ECD<br>12.5% LD<br>50% Calc<br>18.5 g/m$^2$ | Example 12<br>37.5% ECD<br>12.5% LD<br>50% Calc<br>15 g/m$^2$ | Example 13<br>56.3% ECD<br>8.7% LD<br>35% Calc<br>22 g/m$^2$ | Example 14<br>56.3% ECD<br>8.7% LD<br>35% Calc<br>15.0 g/m$^2$ | Example 15<br>56.3% ECD<br>8.7% LD<br>35% Calc<br>12 g/m$^2$ |
|---|---|---|---|---|---|---|
| Basis Wt., g/m$^2$ | 22.1 | 17.9 | 14.7 | 22.9 | 13.9 | 12.1 |
| Yield, yd$^2$/lb. | 24.6 | 30.3 | 36.9 | 23.7 | 39.0 | 44.8 |
| Emb. Cal., mils | 1.08 | .99 | .73 | 1.11 | .70 | .62 |
| Gurley, seconds | 1345 | 814 | 398 | 13,703 | 6930 | 3717 |
| WVTR, g/m$^2$/24 | 4800 | 5725 | 5925 | 950 | 1100 | 2350 |
| MD Tear, g | 98 | 90 | 85 | 371 | 189 | 187 |
| TD 170° F. | 6.0 | 6.8 | 7 | 6 | 7 | 7 |
| Opacity, % | 59.7 | 55.6 | 51.2 | 50.6 | 40.3 | 37.7 |
| MD 10%, g/in | 361.3 | 304.6 | 255.4 | 472.8 | 331.2 | 277 |
| MD 25%, g/in | 391.6 | 331.9 | 281.9 | 526.7 | 327.2 | 280.2 |
| MD Ult., g/in | 441.1 | 367.7 | 311.4 | 526.7 | 352.8 | 296.5 |
| MD Elg., % | 163.2 | 137.3 | 103.2 | 259.8 | 202.8 | 177.2 |
| TD 10%, g/in | 641.4 | 520.5 | 435.5 | 828.2 | 560 | 460.5 |
| TD 25%, g/in | 985 | 806.4 | 678.2 | 1294 | 888.4 | 733.4 |
| TD Ult., g/in | 1578 | 1307 | 1197 | 2569 | 1912 | 1408 |

TABLE 3-continued

ORIENTED FILM PROPERTIES
For samples based on Exceed ™ ECD-112 blended with LDPE (LD-202)

| PROPERTIES | Example 10 37.5% ECD 12.5% LD 50% Calc 22 g/m$^2$ | Example 11 37.5% ECD 12.5% LD 50% Calc 18.5 g/m$^2$ | Example 12 37.5% ECD 12.5% LD 50% Calc 15 g/m$^2$ | Example 13 56.3% ECD 8.7% LD 35% Calc 22 g/m$^2$ | Example 14 56.3% ECD 8.7% LD 35% Calc 15.0 g/m$^2$ | Example 15 56.3% ECD 8.7% LD 35% Calc 12 g/m$^2$ |
|---|---|---|---|---|---|---|
| TD Elg., % | 97.8 | 96.6 | 104.2 | 110.0 | 113.2 | 103.3 |
| DR Limit g/m$^2$ | <11.5 | — | — | <6.4 | — | — |

The "DR Limit" is the basis weight at which we first observed draw resonance. The DR probe was conducted with the fpm fixed at 340 and the extruder RPM reduced gradually until the onset of draw resonance.

TABLE 4

175° F. Orientation
4.5 mil precursor film

| PROPERTY | Example 16 50% $CaCO_3$ in ECD-115 4:1 Draw Ratio | Example 17 50% $CaCO_3$ in ECD-115 6:1 Draw Ratio | Example 18 50% $CaCO_3$ in LL3003.09 4:1 Draw Ratio | Example 19 50% $CaCO_3$ in LL3003.09 6:1 Draw Ratio |
|---|---|---|---|---|
| Basis Weight, g/m$^2$ | 54.7 | 34.5 | 54.84 | 34.87 |
| Embossed Caliper, mils | 2.43 | 1.93 | 3.29 | 2.79 |
| WVTR, g/m$^2$/24 hours | 6100 | 7950 | 6500 | 7250 |
| Gurley Porosity, sec/100 cc | 855 | 307 | 581 | 379 |
| MD Tensile at 5%, g/in | 1094 | 1289 | 1084 | 1344 |
| MD Tensile at 10%, g/in | 2290 | 3034 | 2192 | 3041 |
| MD Tensile at 25%, g/in | 4540 | — | 3774 | — |
| MD Tensile at Break, g/in | 7273 | 7725 | 5085 | 6135 |
| MD Elong. at Break, % | 73.48 | 19.65 | 78.74 | 20.78 |
| TD Tensile at 5%, g/in | 201.1 | 102.4 | 178.7 | 104.9 |
| TD Tensile at 10%, g/in | 333.4 | 196.5 | 293.4 | 184.7 |
| TD Tensile at 25%, g/in | 432.9 | 317.6 | 375.9 | 263.9 |
| TD Tensile at Break, g/in | 568.6 | 318.1 | 482.8 | 276.9 |
| TD Elong. at Break, % | 350.1 | 241.7 | 315.7 | 228.5 |
| MD Elmendorf Tear, grams | 4 | 0 | 2 | 13.2 |
| MD Shrink at 170° F., % | 13.5 | 17.6 | 10.5 | 16.0 |
| TD Shrink at 170° F., % | −3.0 | −3.1 | −3.8 | −2.9 |

Note: All samples oriented with a 15 fpm inlet speed, 190° F. annealing and 5% relaxation.

TABLE 5

175° F. Orientation
6.0 mil precursor film

| PROPERTY | Example 20 50% $CaCO_3$ in ECD-115 4:1 Draw Ratio | Example 21 50% $CaCO_3$ in ECD-115 6:1 Draw Ratio | Example 22 50% $CaCO_3$ in LL3003.09 4:1 Draw Ratio | Example 23 50% $CaCO_3$ in LL3003.09 6:1 Draw Ratio |
|---|---|---|---|---|
| Basis Weight, g/m$^2$ | 63.19 | 47.95 | 65.72 | 44.47 |
| Embossed Caliper, mils | 3.30 | 2.68 | 3.20 | 2.55 |
| WVTR, g/m$^2$/24 hours | 5450 | 7500 | 6250 | 7800 |
| Gurley Porosity, sec/100 cc | 1151 | 363 | 541 | 282 |
| MD Tensile at 5%, g/in | 1336 | 1597 | 1370 | 1659 |
| MD Tensile at 10%, g/in | 2837 | 3691 | 2758 | 3686 |
| MD Tensile at 25%, g/in | 5598 | — | 4736 | 5025 |
| MD Tensile at Break, g/in | 9294 | 9934 | 6131 | 7479 |
| MD Elong. at Break, % | 78.35 | 21.08 | 75.56 | 24.07 |
| TD Tensile at 5%, g/in | 303.9 | 121.3 | 241.8 | 144.2 |
| TD Tensile at 10%, g/in | 473.4 | 238.2 | 379.2 | 245.6 |
| TD Tensile at 25%, g/in | 589.7 | 421.6 | 473.8 | 326.9 |
| TD Tensile at Break, g/in | 820.8 | 464.8 | 634.7 | 356.5 |
| TD Elong. at Break, % | 388.0 | 330.2 | 356.8 | 270.3 |
| MD Elmendorf Tear, grams | 0 | 0 | 13.2 | 13.2 |
| MD Shrink at 170° F., % | 13 | 18 | 11.5 | 14.9 |
| TD Shrink at 170° F., % | −3 | −3 | −3 | −2.5 |

Note: All samples oriented with a 15 fpm inlet speed, 190° F. annealing and 5% relaxation.

TABLE 6

| PROPERTY | | Example 24 mLLDPE 50% $CaCO_3$ 2.7:1 draw ratio | Example 25 Z-N LLDPE 50% $CaCO_3$ 3.8:1 draw ratio |
|---|---|---|---|
| Yield | $yd^2/lb$ | 23.62 | 26.23 |
| Basis Weight | $g/m^2$ | 23.13 | 20.85 |
| Embossed Caliper | mils | 1.26 | 1.61 |
| Gurley Porosity | Seconds/100 cc | 251 | 230 |
| WVTR | $g/m^2/24$ hours | 7613 | 7688 |
| MD Tensile at 5% Elg. | grams/in | 195.5 | 174.7 |
| MD Tensile at 10% Elg. | grams/in | 269.1 | 272.9 |
| MD Tensile at 25% Elg. | grams/in | 301.7 | 321.8 |
| MD Tensile at Break | grams/in | 477.6 | 431.7 |
| MD Elong. at Break | % | 346.4 | 293.7 |
| TD Tensile at 5% Elg. | grams/in | 371.5 | 553.3 |
| TD Tensile at 10% Elg. | grams/in | 622.0 | 980.4 |
| TD Tensile at 25% Elg. | grams/in | 932.9 | 1702 |
| TD Tensile at Break | grams/in | 1650 | 2162 |
| TD Elong. at Break | % | 116.5 | 86.4 |
| TD Shrinkage at 170° F. | % | 4.2 | 4.0 |

We claim:

1. A method of preparing a laminate having good water vapor transmission rate (WVTR), said laminate including a filled film and a fabric bonded thereto, said filled film including an effective amount of filler and having a water vapor transmission rate at least 10% higher than the WVTR described by the equation: WVTR=−10,900+320(filler weight %) and the fabric having an elongation less than 30%, an Elmendorf tear strength of at least 300 g, and a breakload of at least 15 lb./in., the method comprising the steps of:

(a) stretching said film to form a stretched film; and (b) bonding said stretched film to said fabric, to form said laminate;

(c) wherein said film is a polyethylene film including a metallocene catalyzed polyethylene having a $M_w/M_n<3$, and a composition distribution breadth index greater than 60%.

2. The method of claim 1 wherein said lamination is selected from the group consisting of heat lamination, adhesive lamination, extrusion lamination, mechanical bonding and combinations thereof.

3. A process of making a housewrap, comprising:

a) mixing a polyolefin with a filler to form a polyolefin/filler mixture;

b) extruding a film from the polyolefin/filler mixture to form an extruded filled film;

c) melt embossing the extruded filled film to form an embossed film having a pattern of different film thicknesses;

d) stretching the embossed film to impart greater water vapor transmission rate; and e) melt bonding the stretched film to a nonwoven fabric comprising crosslaminated fibers at a temperature and pressure sufficient to bond the fabric and film to form a breathable laminate, wherein said polyolefin includes at least a majority of a metallocene catalyzed polyethylene having a $M_w/M_n$ <3, and a composition distribution breadth index above 60 percent; and wherein the breathable laminate has a water vapor transmission rate at least 10% higher than the WVTR described the equation: WVTR=−10,900+320 (filler weight %).

4. The method of claim 3, further comprising heat setting the stretched film at a temperature above the stretching temperature and below the softening temperature of the stretched film.

5. The method of claim 3, wherein the polyolefin is a copolymer of ethylene and a $C_4$–$C_{10}$ alpha-olefin.

6. The method of claim 4, wherein said filler is calcium carbonate surface treated with calcium stearate.

7. The method of claim 4, wherein the precursor film is melt embossed with a diamond pattern.

8. The method of claim 4, wherein the polyolefin/filler mixture contains between about 30 percent to about 65 percent filler by weight based on the total weight of said mixture.

9. The method of claim 3, wherein the fabric is a nonwoven polyolefin fabric having a heat seal layer.

10. The method of claim 9, wherein the lamination comprises heating the fabric and pressing the unheated film to the heated fabric.

11. A method of making a housewrap, comprising:

a) mixing a polyolefin comprising metallocene catalyzed polyethylene with a filler;

b) cast extruding a precursor film of the polyethylene/filler mixture onto at least one melt embossing roller to form a melt embossed precursor film having a pattern of different film thicknesses;

c) stretching the melt embossed precursor film in the transverse direction to impart greater water vapor transmission rate in the areas of reduced thickness thereof in comparison to the areas of greater thickness, said stretched melt embossed film having a water vapor transmission rate at least 10% higher than the WVTR described by the equation: WVTR=−10,900+320(filler weight %);

d) heating a nonwoven fabric comprising cross-laminated polyolefin fibers and an ethylene-vinyl acetate copolymer heat seal layer; and e) pressing the heated fabric to the melt embossed precursor film at a temperature and pressure sufficient to bond the fabric and film to form a breathable laminate wherein said polyethylene has a $M_w/M_n<3$.

12. The method of claim 11, further comprising heat setting the stretched film at a temperature above the stretching temperature and below the softening temperature of the stretched film, and wherein said polyethylene has a $M_w/M_n<2.5$.

13. The method of claim 11, wherein the polyolefin is a copolymer of ethylene and a $C_4$–$C_{10}$ alpha-olefin.

14. The method of claim 11, wherein the filler is calcium carbonate surface treated with calcium stearate.

15. The method of claim 11, wherein the precursor film is melt embossed with a diamond pattern.

16. The method of claim 11, wherein the polyolefin/filler mixture contains between about 30 percent to about 65 percent filler by weight.

17. The method of claim 11 wherein said film has a WVTR of at at least 20% greater than the WVTR described by the equation:

$$WVTR=-10{,}900+320 \text{ (filler weight \%)}.$$

18. The method of claim 11 wherein said film has a WVTR of at at least 30% greater than the WVTR described by the equation:

$$WVTR=-10{,}900+320 \text{ (filler weight \%)}.$$

19. The method of claim 1, wherein said laminate is a diaper.

20. The method of claim 1, wherein said laminate is an adult incontinence device.

21. The method of claim 1, wherein said laminate is a feminine hygiene article.

22. The method of claim 1, wherein said laminate is a medical gown.

23. The method of claim 1, wherein said laminate is a surgical gown.

* * * * *